Figure 1:
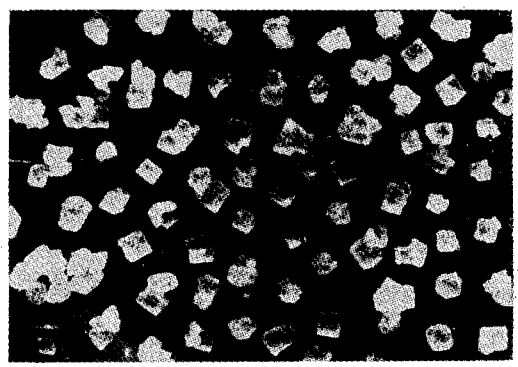

Patented June 5, 1934

1,962,080

UNITED STATES PATENT OFFICE 1,962,080

CRYSTALLINE ANHYDROUS DISODIUM PHOSPHATE AND PROCESS OF MAKING SAME

Kenneth A. Kilbourne and Charles F. Booth, Anniston, Ala., assignors to Swann Research Incorporated, a corporation of Alabama Application August 29, 1932, Serial No. 630,786

13 Claims. (Cl. 23—107)

This invention relates to an improved form of crystalline anhydrous disodium hydrogen orthophosphate and process of producing same.

Previous methods for the production of anhydrous disodium phosphate consist in the formation of a hydrated crystal, followed by dehydration of such crystals until substantially all water has been removed. Since disodium phosphate usually crystallizes with twelve molecules of water as a hydrate of comparatively low melting point, it is difficult to efficiently dehydrate such crystals because of the very low rate of heat transfer through the crystals or the molten mass and also on account of the large amount of water which it is necessary to evaporate.

In conducting experiments on the production of disodium phosphate, we have discovered that if a pure solution of disodium phosphate is prepared by the neutralization of phosphoric acid with soda ash or caustic soda and the solution thus prepared concentrated by boiling off the water from the solution, crystals of anhydrous disodium phosphate will separate therefrom. We have further discovered that by the addition of tetrasodium pyrophosphate to the neutralized solution, not only is it possible to obtain substantially purer crystals of the anhydrous disodium phosphate, but it is further possible to control the crystal shape. As a result of this discovery, we are enabled to prepare at will crystals of a tabular shape or aggregated crystals, or crystals of an intermediate stage of aggregation.

In order that our invention may be more readily understood, we herewith give the following specific examples of our process and the product therein produced, it being understood, however, that our invention is not to be limited thereby, but is susceptible of various changes and modifications without departing from the spirit thereof.

*Example I*

Prepare an aqueous solution of disodium phosphate by adding soda ash to phosphoric acid. While various strengths of acid may be used, we prefer to use as concentrated an acid as is economically feasible, since evaporation costs will be lower. A solution prepared in this manner will contain some dissolved carbon dioxide; however, this is easily eliminated during the subsequent evaporation of the contained water. The solution is now evaporated by the application of heat in a crystallizing evaporator of the circulating type, crystallization taking place at temperatures above 96° C. Evaporators suitable for this operation have long been known. For example, evaporators such as are described in U. S. Patents 1,191,108; 905,568; 1,006,823; British Patent 208,503 or in German Patent 381,054 are suitable. The evaporators described in these patents are characterized by a combination of crystallizing and evaporating means in which the flow of the solution is maintained during evaporation in such a manner that evaporation is effected at a place spaced apart from the crystallizing point.

In order that crystallization may be controlled, we find it desirable to add to the solution undergoing evaporation seed crystals of anhydrous disodium phosphate in known manner. Evaporation is conducted by boiling the solution, the boiling point at normal atmospheric pressure being in the neighborhood of 105°–106° C., but may even be lowered to the neighborhood of 96°–97° C., by the application of a partial vacuum to the apparatus in which evaporation is taking place. The crystals obtained in this manner are euhedral tabular crystals, and are shown in Figure 1 on the accompanying drawing, in which the magnification is 10X.

*Example II*

Figure 2:
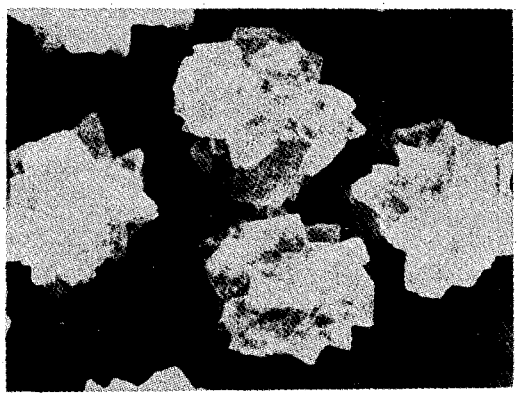

In order to produce aggregated crystals, we proceed in the same manner as indicated in Example I above, except that we add to the evaporating solution, or to the solution before evaporation, a small percentage of tetrasodium pyrophosphate. The amount added may be in the neighborhood of 0.05% of the pyrophosphate, based upon the weight of disodium orthophosphate in solution. The crystals produced in this example are aggregates of singly terminated crystals, the terminations being domes. These crystals are illustrated by Figure 2 of the drawing, in which the magnification is 8X.

It is possible, by suitably proportioning the amounts of tetrasodium pyrophosphate added to the solution, to control the amount of aggregation of the crystals produced. The proportion of the pyrophosphate employed when it is desired to obtain less aggregation than shown in Figure 2 is less than 0.05%. In general, we believe that if it were possible to measure the amount of aggregation of the crystals caused by the presence of the pyrophosphate, it would be found to be proportional to the amount of pyrophosphate in the solution. However, because of the nature of the cause and effect, we are unable to more specifically describe the nature of this relation.

By increasing the pyrophosphate content of the crystallizing solution above the 0.05% figure mentioned above, it is possible to obtain crystals of anhydrous disodium phosphate containing a small percentage of the pyrophosphate. In this manner it is possible to obtain crystals of the anhydrous salt with ½ to 1%, or even 2 or 3%, contained pyrophosphate. Such a product is valuable in the manufacture of aqueous solutions of disodium phosphate where it is desired to prevent the production of turbid solutions due to dissolved iron and aluminum compounds.

Where amounts of the tetrapyrophosphate of the order of 0.05% are present in the solution, the aggregated crystals formed are probably free of the pyrophosphate compound, at least the amount present is so small as to prevent its recognition by known analytical procedures. where greater amounts of the pyrophosphate are present in the crystallizing solution, greater amounts come out with the disodium phosphate crystals. Such amounts thus appearing in the crystals are, however, less than the amounts in solution.

The size of the crystals can, of course, be varied in known manner by merely causing the evaporation to continue for a longer or shorter period of time before removing the crystals from the crystallizer.

Optical examination of the crystals shown in Figures 1 and 2 show both to have similar optical properties. They are biaxial, anisotropic with an optic angle of practically 90° and exhibit the following refractive indices for ordinary light:

$$X=1.482$$
$$Y=1.494$$
$$Z=1.512$$

the error in measurement being of the order of plus or minus 0.003.

The physical properties of both the tabular and the aggregated crystals are such as to render them non-caking and extremely free flowing. Due to the absence of water of hydration in our improved product, a concentrated form of disodium phosphate is available in well-defined crystalline form.

While we have described only a few embodiments of our invention, it will be apparent to those skilled in the art that it is not so limited, but that it is susceptible of various changes and modifications without departing from the spirit thereof, and we desire that only such limitations shall be placed thereupon as may be imposed by the prior art, or as are specifically set forth in the claims.

What we claim is:

1. Process of producing aggregated tabular crystals of anhydrous disodium phosphate which consists in crystallizing the disodium phosphate from a disodium phosphate solution at a temperature of above 96° C., while maintaining a circulation of said solution.

2. Process of producing aggregated crystals of anhydrous disodium phosphate, which consists in crystallizing the disodium phosphate from a solution of disodium phosphate containing a small proportion of tetrasodium pyrophosphate at a temperature of above 96° C., while maintaining a circulation of said solution.

3. Process of producing aggregated crystals of anhydrous disodium phosphate, which consists in crystallizing the disodium phosphate from a solution of disodium phosphate containing at least 0.05% of tetrasodium pyrophosphate based upon the weight of disodium phosphate in said solution, while maintaining a circulation of said solution.

4. As a new product, tabular crystals of anhydrous disodium phosphate.

5. As a new product, aggregated tabular crystals of anhydrous disodium phosphate.

6. As a new product, aggregated tabular crystals of anhydrous disodium phosphate containing a small amount of tetrasodium pyrophosphate added to influence crystal growth.

7. As a new product, aggregated tabular crystals of anhydrous disodium phosphate containing a small amount of tetrasodium pyrophosphate.

8. As a new product, aggregated tabular crystals of anhydrous disodium phosphate containing between ½ and 3 percent of tetrasodium pyrophosphate.

9. As a new product, anisotropic tabular crystals of anhydrous disodium phosphate having the refractive indices:

$$X=1.482$$
$$Y=1.494$$
$$Z=1.512$$

10. As a new product, anisotropic aggregated tabular crystals of anhydrous disodium phosphate having the refractive indices:

$$X=1.482$$
$$Y=1.494$$
$$Z=1.512$$

11. Process of producing aggregated tabular crystals of anhydrous disodium phosphate crystals which comprises crystallizing the disodium phosphate from a disodium phosphate solution at the boiling point at substantially atmospheric pressure and while maintaining a circulation of said solution.

12. Process of producing aggregated tabular crystals of anhydrous disodium phosphate crystals which comprises crystallizing the disodium phosphate from a disodium phosphate solution at a temperature above 96° C. and while maintaining a forced circulation of said solution.

13. Process of producing aggregated tabular crystals of anhydrous disodium phosphate crystals which comprises seeding a solution of disodium phosphate with anhydrous disodium phosphate seed crystals and crystallizing anhydrous disodium phosphate while maintaining a circulation of said solution.

KENNETH A. KILBOURNE.
CHARLES F. BOOTH.